(12) United States Patent
Ward

(10) Patent No.: US 7,159,180 B2
(45) Date of Patent: Jan. 2, 2007

(54) PROXY PLATFORM INTEGRATION SYSTEM

(75) Inventor: Rory Ward, Dublin (IE)

(73) Assignee: America Online, Inc., Dulles, VA (US)

( * ) Notice: Subject to any disclaimer, the term of this patent is extended or adjusted under 35 U.S.C. 154(b) by 449 days.

(21) Appl. No.: 10/017,662

(22) Filed: Dec. 14, 2001

(65) Prior Publication Data

US 2003/0115549 A1    Jun. 19, 2003

(51) Int. Cl.
*G06F 3/00* (2006.01)
(52) U.S. Cl. .................................................. 715/744
(58) Field of Classification Search ............... 345/738, 345/744, 745, 749, 866; 715/738, 744, 745, 715/749, 866
See application file for complete search history.

(56) References Cited

U.S. PATENT DOCUMENTS

| | | | | |
|---|---|---|---|---|
| 5,172,314 | A | 12/1992 | Poland et al. ............... | 364/401 |
| RE34,915 | E | 4/1995 | Nichtberger ................ | 364/401 |
| 5,500,890 | A | 3/1996 | Rogge et al. ................ | 379/91 |
| 5,557,516 | A | 9/1996 | Hogan ......................... | 364/406 |
| 5,557,518 | A | 9/1996 | Rosen ......................... | 364/408 |
| 5,642,419 | A | 6/1997 | Rosen ......................... | 380/23 |
| 5,649,114 | A | 7/1997 | Deaton et al. ............... | 395/214 |
| 5,671,280 | A | 9/1997 | Rosen ......................... | 380/24 |
| 5,715,314 | A | 2/1998 | Payne et al. ................. | 380/24 |
| 5,745,886 | A | 4/1998 | Rosen ......................... | 705/39 |
| 5,825,881 | A | 10/1998 | Colvin, Sr. .................. | 380/24 |
| 5,897,622 | A | 4/1999 | Blinn et al. .................. | 705/26 |
| 5,930,767 | A | 7/1999 | Reber et al. ................. | 705/26 |
| 5,933,140 | A * | 8/1999 | Strahorn et al. ............ | 345/712 |
| 5,966,697 | A | 10/1999 | Fergerson et al. .......... | 705/26 |
| 5,978,840 | A | 11/1999 | Nguyen et al. | |
| 5,987,440 | A | 11/1999 | O'Neil et al. ................ | 705/44 |
| 6,012,083 | A | 1/2000 | Savitzky et al. ............. | 709/202 |
| 6,029,151 | A | 2/2000 | Nikander ..................... | 705/39 |
| 6,049,785 | A | 4/2000 | Gifford ........................ | 705/39 |
| 6,061,665 | A | 5/2000 | Bahreman .................... | 705/40 |
| 6,070,150 | A | 5/2000 | Remington et al. .......... | 705/34 |
| 6,105,004 | A | 8/2000 | Halperin et al. ............. | 705/28 |
| 6,138,148 | A | 10/2000 | Lipkin ......................... | 709/206 |
| 6,144,988 | A | 11/2000 | Kappel ........................ | 709/202 |
| 6,154,738 | A | 11/2000 | Call ............................. | 707/4 |
| 6,300,947 | B1 * | 10/2001 | Kanevsky .................... | 345/866 |
| 6,452,609 | B1 * | 9/2002 | Katinsky et al. ............ | 345/716 |
| 6,473,738 | B1 * | 10/2002 | Garrett ........................ | 705/26 |
| 6,549,612 | B1 | 4/2003 | Gifford et al. | |
| 6,714,992 | B1 * | 3/2004 | Kanojia et al. ............. | 719/321 |
| 2001/0021917 | A1 * | 9/2001 | Hatano ........................ | 705/26 |
| 2001/0034720 | A1 * | 10/2001 | Armes ......................... | 705/65 |
| 2002/0103712 | A1 * | 8/2002 | Rollins et al. ............... | 705/26 |

FOREIGN PATENT DOCUMENTS

| | | |
|---|---|---|
| EP | 858 201 | 8/1998 |
| EP | 917 119 | 5/1999 |
| EP | 917 120 | 5/1999 |
| EP | 917 327 | 5/1999 |
| EP | 965 927 | 12/1999 |

* cited by examiner

*Primary Examiner*—Kristine Kincaid
*Assistant Examiner*—Thanh Vu
(74) *Attorney, Agent, or Firm*—Michael A. Glenn; Glenn Patent Group

(57) ABSTRACT

A method and system is disclosed for adding or removing functionality to a website through a proxy platform by which a user views the website. One such functionality is a checkout button by which a cyber wallet is accessed, relaying purchase information to the website where the information is used automatically fill a merchant website purchase form.

22 Claims, 5 Drawing Sheets

PROXY PLATFORM INTEGRATION SYSTEM

BACKGROUND OF THE INVENTION

1. Technical Field

The invention relates generally to the purchase of products over the internet and, more particularly, is directed to an apparatus and method for integrating options and services offered by a service provider onto a merchant website.

2. Description of the Prior Art

The World Wide Web (Web) is part of a global computer network known as the Internet. Scientists and academicians initially developed and used the Internet to share information and collaborate. The Web functions as an object based multimedia system. It allows for the creation, storage and delivery of multimedia objects. Recently, on-line service providers, such as Microsoft Network, CompuServe, Prodigy and America Online, have linked to the Web. This enables their customers to access a variety of products and services available from independent content providers and other Web users. For example, a typical customer can access electronic mail, news services, travel services and online stores and malls on the Web.

The global penetration of the Internet provides merchants with the capability to merchandise their products to substantial shopping audiences using an online merchant system. Online merchant systems enable merchants to creatively display and describe their products to shoppers using Web pages. Merchants can layout and display Web pages having content such as, text, pictures, sound and video, using HyperText Markup Language (HTML). Web shoppers, in turn, access a merchant's Web page using a browser, such as Microsoft Explorer or Netscape Navigator, installed on a client connected to the Web through an online service provider, such as the Microsoft Network or America OnLine. The browser interprets the HTML to format and display the merchant's page for the shopper. The online merchant system likewise enables shoppers to browse through a merchant's store to identify products of interest, to obtain specific product information and to electronically purchase products after reviewing product information.

A problem with commerce over the Internet is that the customer generally must type in and transmit a plethora of information, including confidential financial information, each time the customer wishes to purchase something from a merchant. The type and form of such information varies from merchant to merchant, and each merchant typically has a customized electronic order form. This is a hassle for the customer. It also requires confidential information to be placed at risk each time such information is transmitted to a new merchant.

Another problem with commerce over the Internet is the lack of standards and integration for conducting digital commerce. Creating a virtual store often is expensive and time consuming because merchants must create custom systems for selling their merchandise and making sure they obtain adequate information and payment from customers.

The recent proliferation of client-server based distributed systems has led to the development of numerous server applications, located on server computer systems, that interact with client applications, located on client computer systems. For example, one recently developed client application is a cyber wallet, which contains financial instruments in electronic form, such as electronic cash, electronic debit cards or electronic credit cards. An electronic wallet typically resides on a client computer system, and performs financial transactions, such as purchases, by communicating with a server application on a server computer system. For example, a user on a client computer system might decide to purchase software from a server computer system that belongs to a software vendor. Protocols such as the Secure Electronic Transactions (SET) protocol and the Open Trading Protocol (OTP) enable the server computer system to receive a payment for the software from an electronic wallet on the client computer system. Using these protocols, this payment is automatically deducted from an account linked to the electronic wallet on the client computer system, and is automatically credited to an account linked to an application on the server computer system.

One problem with many existing server-based applications, as well as with protocols such as SET and OTP, is that they are designed to interact with a client application that resides on a client computer system. Locating an application, such as an electronic wallet, on a client computer system has certain disadvantages. First, an owner of the client application may want to use the client application from a number of different client computer systems. In this case, if the client application is tied to a particular client computer system, the owner of the client application cannot access the client application from another client computer system. Second, installing a client application, such as a wallet, on a client computer system can take up storage space on the client computer system and may require additional maintenance on the client computer system to update the client application, for example. Additionally, retrieving code from a server computer system can incur a long delay in downloading the code from the server computer system.

Electronic shopping and merchandising system, U.S. Pat. No. 5,897,622, Blinn, Apr. 27, 1999 discloses a merchant system that includes a dynamic page generator, a configurable order processing module and a database module capable of retrieving data from the database without regard to its schema. The system enables merchants to create electronic orders which are easily adaptable for different sales situations. While this invention discloses improvements to make the modification of a website easier, the system does not disclose how it could be integrated with other systems.

Public network merchandising system, U.S. Pat. No, 5,825,881, Colvin, Sr., Oct. 20, 1998 discloses a system for conducting commerce over a large public network such as the Internet where the system facilitates communications between a merchant, a customer, and a bank or credit card processor by using a cyber wallet. However, while a cyber wallet is disclosed, no teaching is disclosed as to how to integrate such a cyber wallet across multiple non-integrated websites.

What is needed is a system that integrates a cyber wallet with any client computer system without the need for high-level integration, and where the cyber wallet is not located on a client computer system. What is needed is a system that can deliver the benefits of a highly integrated system in a shorter period of time.

SUMMARY OF THE INVENTION

A method and system is herein disclosed for adding and/or removing functionality and elements on a website through a proxy platform by which a user views the website. The proxy platform acts as an intermediate website that alters the appearance of another website. The proxy platform adds, removes or rearranges elements on the other website.

The proxy platform adds functional elements such as a button that can interact with the website.

A checkout button on the proxy platform provides automatic form filling by accessing a cyber wallet and relaying purchase information to a merchant website. Each piece of information is designated properly and entered onto the merchant's purchase form.

A proxy platform is created by parsing a website, and mapping the elements of the website. Rules are created that designate how the elements of the website are to be manipulated.

BRIEF DESCRIPTION OF THE DRAWINGS

FIGS. 3A, 3B, 3C and 3D are diagrams illustrating a sequence of web pages that are part of an online purchase process viewed through a proxy platform according to the invention;

DESCRIPTION OF THE PREFERRED EMBODIMENT

Figure 1:
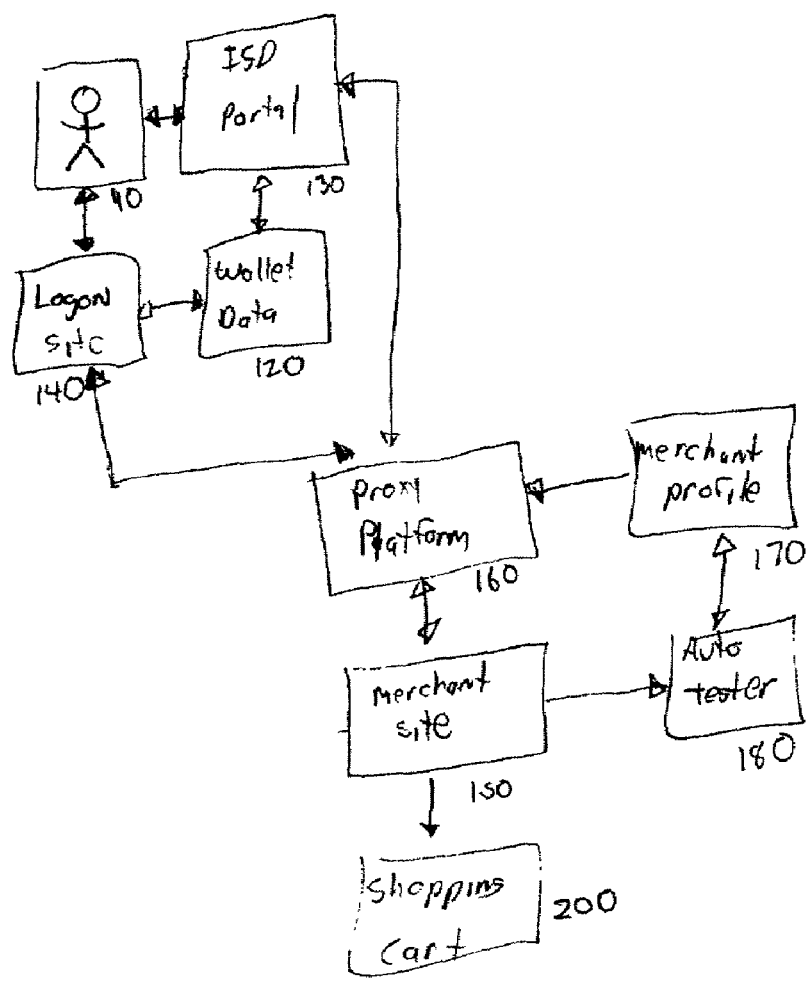
FIG. 1 is a flowchart illustrating a preferred embodiment of the interaction between a user, proxy platform and a merchant website according to the invention.

FIG. 1 is a diagram of the several interrelated elements that combine to produce a preferred embodiment of the invention. A user 110 accesses his account information or wallet data 120 by logging on to the internet through an internet service provider (ISP) portal 130, such as America Online by America Online Inc. of Vienna, Va., or by logging on to the Internet and then logging onto a web site 140 that has cyber wallet data. If the user connects to the Internet through the ISP portal 130, then her wallet information is automatically accessed at the logon time.

A cyber wallet 120 uses a public key encryption system that secures credit card information and details about a purchase in a secure electronic envelope for distribution between a merchant, to the bank, and back. When a consumer/user makes a purchase over the Internet and sends the transaction to a merchant, the merchant, automatically, through its software, adds transactional information to the purchase and then forwards it to a cyber wallet provider, where the transaction is reformatted and sent to the merchant's bank. The merchant's bank then sends the authorization request to the issuing bank through the card associations. Once the issuing bank approves the purchase, the transaction is then sent back through the cyber wallet provider server for secure encryption and on to the merchant, who sends the consumer an electronic receipt and fills the order. The whole process takes about 15 to 20 seconds. The consumer receives an electronic receipt and the order is sent out by mail or other ground or air delivery.

A user accesses a merchant site 150 through the proxy platform 160. The proxy platform is an overlay platform or website by which other websites are viewed. The proxy platform is an interface that makes adjustments as to how a website is viewed. The proxy platform adds, removes, or rearranges the appearance of website elements. Examples of such website elements are banner ads, advertisements, adult material, buttons, checkboxes, sidebars and user chosen elements.

Figure 2A:
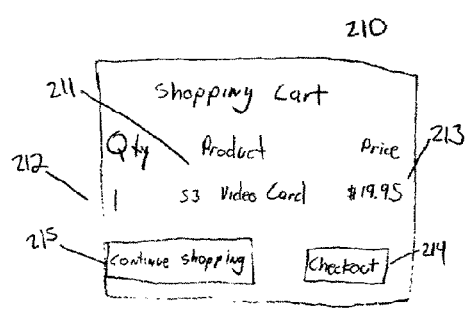
FIGS. 2A, 2B, 2C and 2D are diagrams illustrating a sequence of web pages that are part of an online purchase process.

In a preferred embodiment, a website's checkout page is altered such that a checkout button is added that accesses the user's cyber wallet. FIGS. 2A–2D illustrate a series of web pages that are part of a non-proxied checkout process. FIG. 2A illustrates a first page in the website checkout process. The website purchase form 210 shows the product to be purchased, an S3 video card 211, the quantity selected 212, and the price 213. To move to the shipping page, the user selects the checkout button 214. The user may also continue shopping by pressing the continue shopping button 215.

Figure 2B:
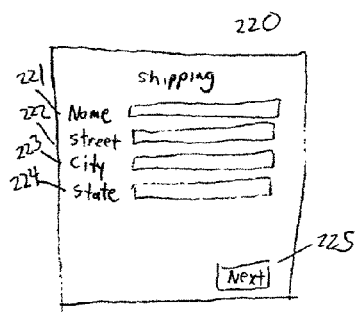

FIG. 2B illustrates the shipping web page 220 where the user fills in shipping information, such as, name 221, street 222, city 223 and state 224. After filling in the shipping information, the user pushes the next button 225 to move to the billing information web page.

Figure 2C:
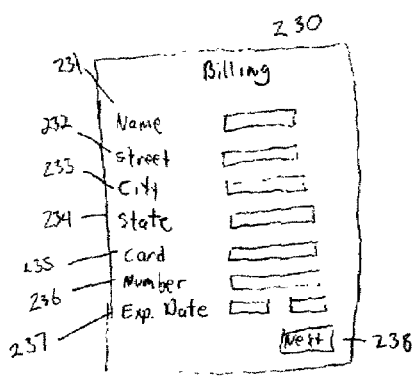
Figure 2D:
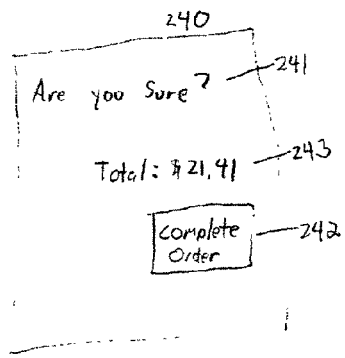

FIG. 2C illustrates the billing page 230 where the user fills in billing information, such as, name 231, street 232, city 233, state 234, credit card type 235, credit card number 236, and expiration date 237. After filling in the billing information, the user selects the next button 238, to bring him to the complete order page 240 as shown in FIG. 2D. The complete order page 240 asks the user if he is sure about his purchase 241. If the user is sure he then presses the complete order button 242. The total cost of the purchase is also displayed 243. The user is then brought to a confirmation page (not shown) and/or is sent a confirmation email.

Figures 3A, 3B, 3C, 3D:
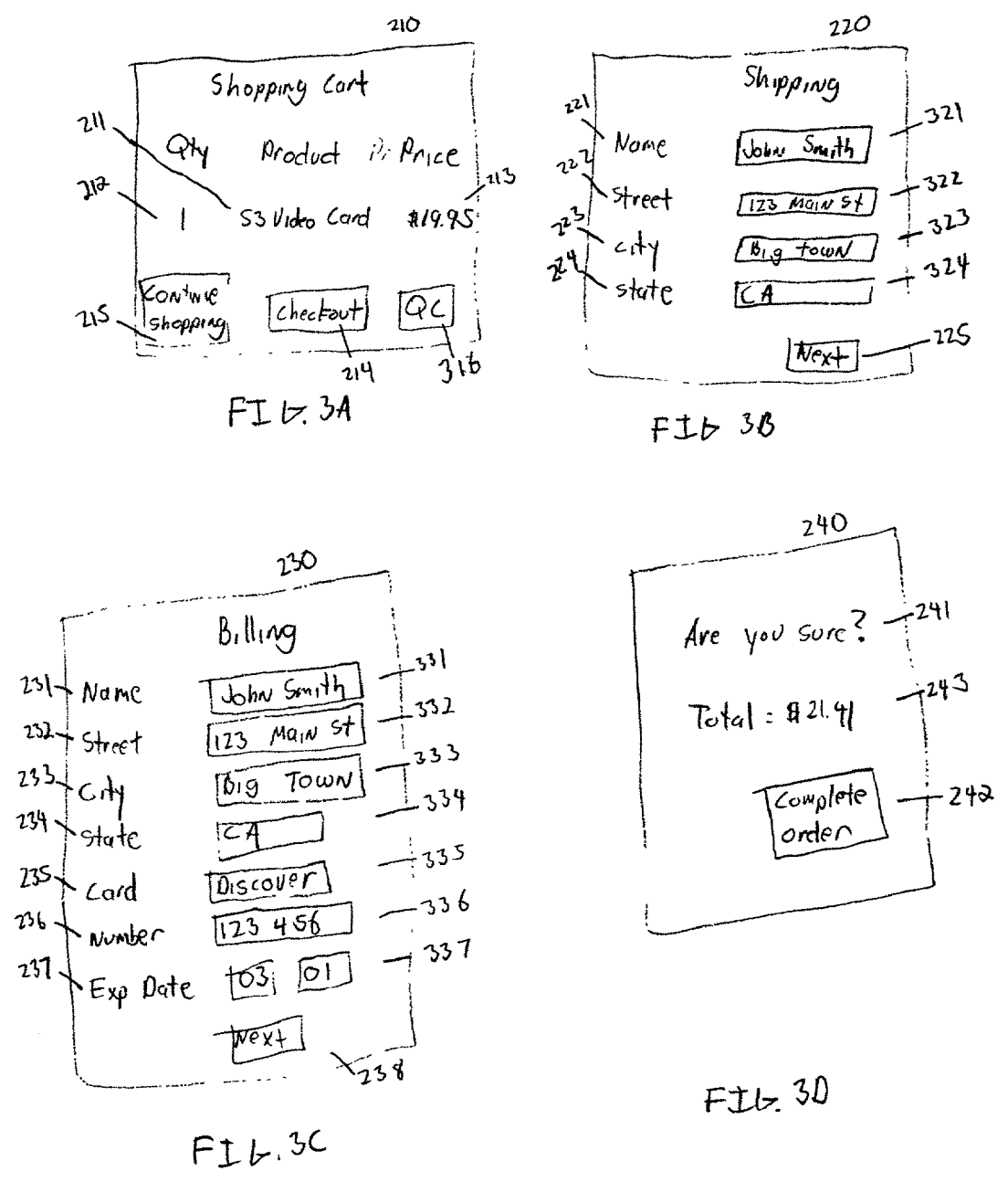

FIGS. 3A–3D illustrate the same series of website pages, viewed through a proxy platform. In FIG. 3A, the proxy platform adds a quick checkout button 316 that provides all the purchase information automatically from a cyber wallet, and completes the checkout process. The pressing of the checkout button 316 initiates a query of cyber wallet information. Typically the cyber wallet information is stored so that it is easily accessible by the proxy platform, for example, within the same system. After the purchase information is entered onto the merchant website, the merchant's own checkout process is initiated. The merchant's checkout process enters the information onto their database, and also uses their system to approve credit card purchases.

FIG. 3B illustrates the shipping web page 220 as viewed through the proxy platform. The proxy platform has taken the information from the user's cyber wallet and filled in the fields 321, 322, 323, 324 corresponding to the name 221, street 222, city 223 and state 224, respectively. To move to the billing web page, the user presses the next button 225.

Similarly, in FIG. 3C, the billing fields, 331, 332, 333, 334, 335, 336, 337 have been filled in by the proxy platform corresponding to the name 231, street 232, city 233, state 234, credit card type 235, credit card number 236, and expiration date 237. To move to the complete order screen 240, the user presses the next button 238. The complete order screen is the same as the non-proxied complete order screen, and the user completes the order by pressing the complete order button 242.

The proxy platform is created and maintained by analyzing the merchant website, creating a merchant proxy platform profile 170, and maintaining and updating the proxy profile.

Analyzing the Merchant Website

In a preferred embodiment, analyzing the merchant website involves parsing the website, more particularly the checkout process, to determine the rules to create, to form-fill the checkout pages. Each web page is cataloged by region and mapped by fields. Most checkout pages are similar, but some require special handling. Once the information is captured, it is made available for inspection and modification to create rules that define how the page is manipulated.

Creating a Merchant's Proxy Platform Profile

Once the merchant site is analyzed for checkout flow and field mapping, the information is used to create the merchant's proxy platform profile. Proxy platform profiles are extensible markup language (XML) text files created with a text editor. Each merchant that participates in the proxy platform has a profile residing in the proxy server that defines how the proxy platform interacts with the existing merchant checkout process.

Unique proxy profiles are written for each merchant in the system in order to fire specific rules on specific pages. These rules include button splicing and mapping merchant form fields to a user's cyber wallet data. Rewriting the original website URL to the proxy URL, handling of the redirection, and the handling of cookies are automatically processed. Tags identify regions of the page that will be changed.

A master XML file lists all the merchant sites that are proxy platform enabled and maps each website to their profile. The master XML file contains the domain name of the merchant sites and a reference to the rule files to be called when the proxy encounters that particular domain or domains. Each profile has proxy and reqproxy rules. These rules apply to the merchant domain. A proxy rule fires on pages that come from the merchant to the user. The reqproxy rules fires when a request comes from the user to the merchant site. The master XML file is read when the proxy platform is initialized. Each profile of a merchant website contains both proxy and request rules.

Proxy rules manipulate typical responses containing HTML. They include:
1. Rules for form filling, such as mapping cyber wallet variables to elements in the forms of the target page. These are identified by form filling tags.
2. Rules for manipulating client-side Javascript (discussed infra).
3. Rules for splicing buttons into pages.
4. Rules for supporting cyber wallet order placements.
5. Rules for supporting a help sidebar (discussed infra).

Request rules are used for manipulating requests, such as converting encrypted credit card numbers to clear credit card numbers. The proxy platform does not return a user's credit card number from the cyber wallet to the user because it is possible that there will be unauthorized access to a user's account. A request rule removes the masked credit card number and replaces it with the full credit card number. The profile_req.XML file contains the request rule for the merchant profiles. This rule fires when a request comes from the user to the merchant and tells the proxy what to do with the request.

Profile.XML files contain specific rules for specific merchants. Each rule consists of:
1. A request or response page identifier that identifies the specific merchant page. This can but is not always, a URL.
2. A path through a simple document object model that identifies the page element of interest, also known as a region.
3. An action to be performed on a region.

Firing rules tell the proxy what action to perform on a particular merchant page. URL declarations are used in conjunction with a rule to tell the proxy how to recognize a merchant's URL page. When the proxy gets a request for a merchant page, it matches the URL against the entries contained in a hash table. It performs the match depending on the URL declaration in the merchant profile. Examples of URL declarations are exact, noargs and globexpr.

Exact declarations are used to identify a merchant web page and to fire rules by exactly matching a hash table entry with the web page URL. Noargs match disregards any arguments appended to the URL, allowing the proxy to take the remaining URL and compare it to the hash table for a match. Globexpr match provides the same matching used by Unix shells to support filename wildcarding, namely, the use of global expressions as a variable to use in matching.

Post URL rules are used for web pages that have single URL's which generate successive pages with query strings appended to the URL. Post URL rules fire on the subsequent pages generated this way.

Spliced buttons are typically placed in obvious and logical positions. Proxied checkout buttons are typically placed at the bottom of a web page because a user usually reads information from top to bottom, and thus the placement allows the user to conveniently scroll through a page and then checkout. Form filling buttons are usually spliced into the page code between the opening and closing form tags.

Form filling rules are needed to map the proxy platform values in the user's cyber wallet, to the corresponding fields on the merchant's checkout forms. This involves mapping rules for elements contained within the merchant's form. Form filling rules information include, the URL of the merchant checkout page, the tag address of the field on the merchant checkout form, the name of the field on the merchant checkout form, the type and sub-type of the field on the merchant checkout form, the mapping type to be used by the proxy platform to fill this field, the cyber wallet field name used to fill the field and mapping specific rules. Examples of mappings are matching to text, radio mapping and select mapping.

Matching to text comprises rules that define mapping a text field on the checkout form to a corresponding cyber wallet value. It is also contemplated that a hard coded value may be used to fill in a value on the merchant website.

Radio mapping rules define mapping between a radio field on a merchant checkout form to the cyber wallet field values. Mapping rules define the mapping between a selected field on a merchant checkout form to the corresponding cyber wallet field value.

Partial value rules provide flexibility when a website field name doesn't fully match the cyber wallet field value, but partially matches it. Partial value rules look to match only a substring value between the merchant web page and the cyber wallet.

Select mapping rules define the mapping between a selected field on a merchant checkout form to the corresponding cyber wallet value. Checkbox mapping rules define the mapping between a checkbox field on a merchant web page to cyber wallet field values. Checkbox mapping also bridges checkbox selections made on a proxy platform with a merchant web page.

Phone numbers recorded in a cyber wallet do not have to be in any particular form. For example, the number (800) 555-1212, can also be written as 800-555-1212 or 8005551A1A. To remove possible problems, the proxy platform removes non-alpha numeric characters in phone numbers. The proxy platform also translates alphabetic characters into their corresponding numbers.

Placing an order comprises communicating to the cyber wallet the total amount, line items, and the merchant where the user has made the purchase. The order total is identified by executing a Javascript rule on an incoming response to an incoming total query. The portion of the merchant web page where the order total appears must be correctly identified, typically the last page that appears as part of the purchase process.

Maintaining and Updating the Merchant's Proxy Profiles

Merchants maintain their own web sites, and they often update and redesign them. If the fields in the merchant checkout forms are changed or rearranged, or the checkout page flow has been altered, the merchant's proxy platform profile is also changed because changes cause mismatches with the proxy platform scheme. An autotester 180 is used to check the validity of the proxy platform information. The auto tester checks the web page to see if any changes have been made, and that the proxy platform commands are still valid. If there has been a change, then an alert is made in the form of an error log. The web page is then reparsed, and a new profile is made.

In another embodiment of the invention, the proxy platform dynamically examines all Javascript contained on a profiled website to ensure that the Javascript behaves correctly. Javascript is a programming language that is often used in Internet applications because it provides a more flexible method for interfacing with browsers. When a site provides information in Javascript to the web server, the web server interprets the Javascript to generate instructions that form a web page. The web server then sends the formatted web page to the browser. The web page appears as though it was retrieved from a web site. Use of Javascript by web sites has become more common as Javascript provides such interactive capabilities.

All Javascript contained on the website, whether in-line in the html page, or in a js file, is examined if to see if its use will interfere with communications between the proxy platform and the website. Example of such use includes write, writeln, location of cookies, and document and window functionality. Each use of Javascript is dynamically rewritten on the fly to guarantee that they behave so as to support the user-to-proxy platform-to-website communication.

One method of rewriting is to rewrite those Javascripts with certain tags, for example, those between the <SCRIPT> tag and the </SCRIPT> tag. Javascript is defined in-line in an HTML tag or by a specific tag or specific tag attribute. When a tag or tag attribute is found, the Javascipt is rewritten, for example, the onClick attribute of input tags on a form. Access to document object hierarchy allows full manipulation of the current page. The functions add, remove and get/set HTML attributes are performed in Javascript.

An example of the format looks like the following:
<RULE NAME="Victorias_Secret_button_splice">
<URL MATCHSTYLE="NOARGS"><![CDATA[http://www.victoriassecret.com/cgi-bin/ncommerce3/Host Shopbag]]></URL>
>!--
An example of selectively rewriting embedded Javascript in tags is rewriting the onClick attribute of input tags in a form as shown in the following:
-->
<TAG NAME="FORM" NUMBER="1">
<ACTION>
<TAGJSREWRITE>
<CHECKTAG NAME="INPUT"/>
<CHECKATTR NAME="onclick"/>
</TAGJSREWRITE>
</ACTION>
</TAG>
</RULE>

In this example, every INPUT tag with FORM=1 is checked, if
one is found and it has an onclick attribute, then the value of the Onclick attribute is rewritten.

Legal values for check tag names include, but are not limited to:
A,ABBREV,ACRONYM,ADDRESS,APPLET,AREA,AU, B,BANNER,BASE,BA SEFONT,BGSOUND,BIG, BLINK,BLOCKQUOTE,BODY,BR,CAPTION,CENT ER,CITE,CODE,COL,COLGROUP,CREDIT,DD,DEL, DFN,DIR,DIV,DL,DT,E M,EMBED,FIG,FN,FONT, FORM,FRAME,FRAMESET,H1,H2,H3,H4,H5,H6,H EAD,HTML,HR,I,IMG,INPUT,INS,ISINDEX,KBD, LANG,LH,LI,LINK,MAP,MAR QUEE,MENU,META, NEXTID,NOBR,NOEMBED,NOFRAME,NOF- RAMES,NO TE,OBJECT,OL,OPTION,OVERLAY,P, PARAM,PERSON,PRE,Q,RANGE,S, SAMP,SCRIPT, SELECT,SMALL,SPOT,STRONG,STYLE,SUB,SUP, TAB,TA BLE,TBODY,TD,TEXTAREA,TFOOT,TH, THEAD,TITLE,TR,TT,U,UL,VAR,W BR Legal values for check attribute names include, but are not limited to:
onabort,onblur,onchange,onclick,ondblclick,ondragdrop, onerror,onfocus,onke ydown,onkeypress,onkeyup,onload,onmousedown,onmousemove,onmouse out,onmouseover, onmouseup,onmove,onreset,onresize,onselect, onsubmit,onu nload Rewriting across all pages on a website may be necessary, for example, when there is a select menu that uses some Javascript to move to a particular part of the site. Proxy platform tag rewriting instructions are contained in a master .XML file. Javascript rules for the proxy platform are captured within XML files that include the rule address.

The proxy platform introduces global objects with global properties and functions. These global objects include region, pen, and ruleinfo. The pen provides Javascript rules with the ability to insert new HTML into a region. The ruleinfo object provides meta-information about the rule itself, such as, the URL that triggered it and the debugging level.

The region object provides access to the HTML captured during rule evaluation. It resembles the document object within client-side Javascript. There are several properties of the region object, such as, tokens which are a JSArray of all the tokens within the region, tags which are a JSArray of all the tags within the region, text which are a JSArray of all the text within the region, images which are a JSArray of all images within the region, forms which are a JSArray of all forms within the region and anchors which are a JSArray of all anchors within the region.

The pen is a global object that rule authors use to insert HTML. A Javascript rule moves pens around to different locations within a region. HTML is then written at the penned location. Examples of pens are:

| | |
|---|---|
| moveToAfter (object location) | moves pen after a specified object |
| moveToBefore | moves pen before a specified object |
| writeln (string value) | writes string value at current pen position |
| write (string value) | writes string value at current pen position |

Before rule execution, the pen is positioned at the end of the captured region. After a write, the pen is positioned immediately after the just written HTML.

The ruleinfo object is a global object used to obtain information about the current rule invocation. This includes for example, the URL that triggered the rule and the debugging level for the rule. Examples of ruleinfo objects are:

| | |
|---|---|
| URL | the URL that triggered the rule |
| checkingon | rule debugging/checking is on (Boolean) |
| checkinglevel | checking level, meaningful only if checkingon=true. Higher levels imply more debugging output |

In another embodiment of the invention, the proxy platform is used to offer or deny user privileges. In the environment of network, a network user logs on using a user id and a password. The user id identifies what privileges the user has. The information is used to select a proxy profile that corresponds to these privileges. The buttons available through the proxy platform correspond to their privileges For example, a mailroom clerk would not have an employee salary information button that a human resources person would. With that button a human resources person can access a link to files regarding human resource matters. It is also contemplated that this embodiment can be used over other communication mediums, for example, the Internet and infrared communication between PDA's.

Figure 4A:
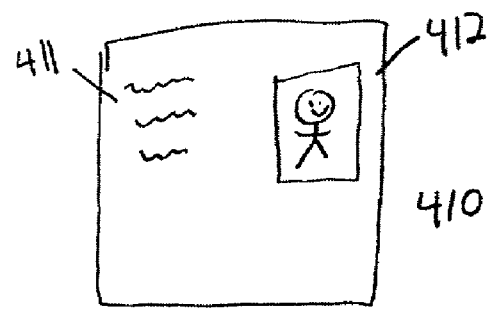
FIGS. 4A, 4B and 4C are diagrams illustrating a website viewed through a computer screen, a PDA, and through a proxy platform on a PDA, respectively, according to the invention.
Figure 4B:
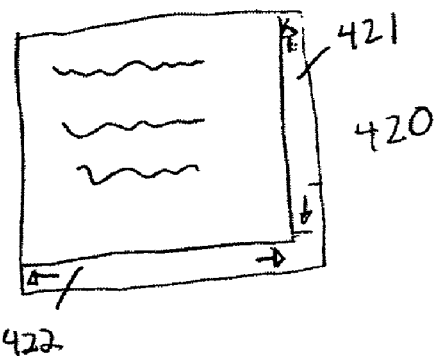

In another embodiment of the invention, the proxy platform is used to reformat the appearance of a web site, such that website viewing is user friendly for cellular phone and PDA users. Web sites are typically designed to be viewed by monitors of fourteen inches in diagonal length, or larger. However, the viewing size of a cell phone is typically one inch, and PDA's four inches. Also, the screen dimensions of cell phones and PDA's are different than the 4×3 dimensions of a computer monitor. Thus, the proxy platform reformats the web site so that web site articles, such as, text, images, tags, tokens, etc, are placed in an easily viewed manner. FIG. 4A illustrates a web site as viewed on a computer screen 410. Note that the pictures 412 lie next to the text 411. FIG. 4B illustrates the same web page as viewed through a PDA 420. The viewing area of the PDA is smaller than the monitor, such that the whole web page cannot be viewed without scrolling up and down 421, and left and right 422.

Figure 4C:
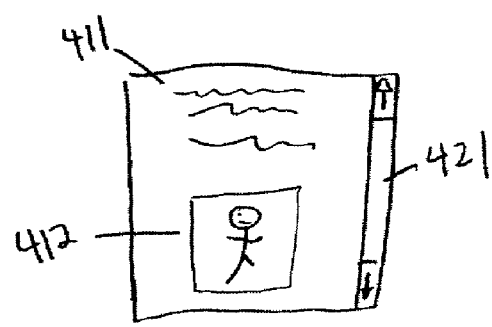

FIG. 4C illustrates the same website as viewed through the proxy platform. The proxy platform moves the pictures 412 from the side of the text 411, to below the text 411, so that a user need only scroll up and down 421 to view the website.

Figure 5:
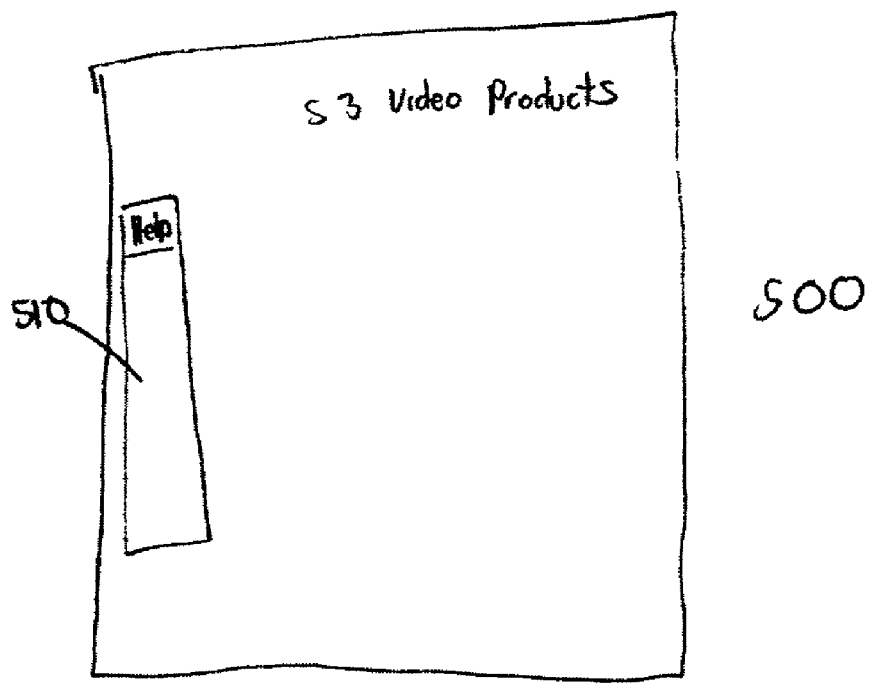
FIG. 5 is a diagram illustrating a help bar added onto a website through a proxy platform according to the invention.

In another embodiment of the invention a help sidebar on the proxy platform helps a user to understand what the proxy platform is doing for them and what they should do on the merchant web site to take advantage of the proxy platform. The sidebar 510 is placed, seemingly embedded within the web page 500 as shown in FIG. 5. Opening and closing the sidebar is actuated by opening and closing an embedded sidebar function.

In another embodiment of the invention, wallet information is maintained on merchant websites. The wallet information entered at a merchant website is then recorded at the proxy platform. Any changes of wallet information at the merchant website are also recorded at the proxy platform. Also, any changes to wallet information made at the proxy platform are sent to the merchant website. Periodic checks are made between the merchant website and the proxy platform to see if the wallet information matches up. If there are differences, then the file with the latest update is considered the current valid wallet information.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A method to facilitate user interaction with merchant web sites, the method comprising operations of:
    independent of user interaction with merchant web sites, pre-preparing a proxy platform corresponding to participating merchant web sites by performing operations comprising:
        planning a modified presentation of each participating merchant web site including one or more changes to functionality of the web site;
        generating rules to fill-in purchase checkout forms of each participating merchant web site with data from users' cyber wallets accessible to the proxy platform;
    responsive to a user's request to view a merchant web site for which a corresponding pre-prepared proxy platform exists, performing operations comprising:
        utilizing the requested web site's proxy platform as an overlay to provide the user with the modified presentation instead of the requested web site;
        responsive to user initiation of a purchase transaction upon the requested web site, the proxy platform automatically retrieving personal data from the user's cyber wallet and entering said retrieved information upon the requested web site in accordance with the rules to complete the initiated purchase transaction.

2. The method of claim 1, the utilizing operation further comprising:
    redirecting user requests to a proxy platform web site instead of the requested web site.

3. The method of claim 1, wherein the rules include mapping items of data from the users' cyber wallets to corresponding fields in the merchants' purchase checkout forms.

4. The method of claim 1, wherein each cyber wallet includes data pertaining to a user and including at least finance data and shipping data.

5. The method of claim 1, where:
    the modified presentation includes a quick checkout button;
    the operation responsive to user initiation of a purchase transaction upon the requested web site is responsive to user activation of the quick checkout button.

6. The method of claim 1, the operations further comprising:
    on a predetermined schedule, checking the merchant web page to determine whether any change has occurred rendering the proxy platform at least partially invalid;
    if so, performing operations including re-performing at least one of the planning and generating operations sufficient to restore the proxy platform to a valid state.

7. The method of claim 1, where:
    the operation of preparing the proxy platform comprises preparing a different merchant profile for each of multiple merchant web sites, where each merchant profile includes the modified presentation and rules applicable to that merchant;

the utilizing operation comprises utilizing the proxy platform, according to the merchant profile corresponding to the requested web site, as an overlay to provide the user with the modified presentation instead of the requested web site.

8. The method of claim 1, where the rules include:
proxy rules applicable to data transmitted from the merchant web site to the user;
reqproxy rules applicable to data transmitted by the user to the merchant web site.

9. The method of claim 1, where the cyber wallets comprise one or more predetermined data storage sites.

10. A system to facilitate user interaction with merchant web sites, comprising:
a merchant profile corresponding to participating merchant web sites, pre-prepare independent of user interaction with merchant web sites, the merchant profile comprising one or more computer-readable media tangibly embodying of machine-readable instructions executable by one or more digital data processors to provide:
a modified presentation of each participating merchant web site including one or more changes to functionality of the web site;
rules to fill-in purchase checkout forms of each participating merchant web site with data from users' cyber wallets accessible to a proxy platform;
a proxy platform comprising one or more computer-readable media tangibly embodying machine-readable instructions executable by one or more digital data processors to perform operations responsive to a user's request to view a merchant web site for which a corresponding pre-prepared merchant profile exists, the operations comprising:
utilizing the request web site's proxy platform as an overlay to provide the user with the modified presentation instead of the requested web site;
responsive to user initiation of a purchase transaction upon the requested web site, the proxy platform automatically retrieving personal data from the user's cyber wallet and entering said retrieved information upon the requested web site in accordance with the rules to complete the initiated purchase transaction.

11. The system of claim 10, the proxy platform programmed such that the utilizing operation further comprises:
redirecting user requests to a proxy platform web site instead of the requested web site.

12. The system of claim 10, wherein the rules include mapping items of data from the users' cyber wallets to corresponding fields in the merchants' purchase checkout forms.

13. The system of claim 10, further comprising the cyber wallets, wherein each cyber wallet includes data pertaining to a user and including at least finance data and shipping data.

14. The system of claim 10, where:
the modified presentation includes a quick checkout button;
the proxy platform is programmed such that user initiation of a purchase transaction upon the requested web site comprises user activation of the quick checkout button.

15. The system of claim 10, further comprising an autotester programmed to perform operations comprising:
on a predetermined schedule, checking the merchant web page to determine whether any change has occurred rendering the proxy platform at least partially invalid;
if so, performing operations including re-performing at least one of the planning and generating operations sufficient to restore the proxy platform to a valid state.

16. The system of claim 10, where:
the system includes multiple merchant profiles, each pertaining to a different merchant web site;
the proxy platform is programmed such that the utilizing operation comprises utilizing the proxy platform, according to the merchant profile corresponding to the requested web site, as an overlay to provide the user with the modified presentation instead of the requested web site.

17. The system of claim 10, where the rules include:
proxy rules applicable to data transmitted from the merchant web site to the user;
reqproxy rules applicable to data transmitted by the user to the merchant web site.

18. The system of claim 10, further comprising the cyber wallets, where the cyber wallets comprise one or more predetermined data storage sites.

19. A system to facilitate user interaction with merchant web sites, comprising:
merchant profile means corresponding to participating merchant web sites, pre-prepared independent of user interaction with merchant web sites, the merchant profile means comprising:
means for modified presentation of each participating merchant web site including one or more changes to functionality of the web site;
rules means for filling-in purchase checkout forms of each participating merchant web site with data from users' cyber wallets accessible to a proxy platform;
proxy platform means for performing operations responsive to a user's request to view a merchant web site for which a corresponding pre-prepared merchant profile exists, comprising:
means for utilizing the requested web site's proxy platform as an overlay to provide the user with the modified presentation instead of the requested web site;
means responsive to user initiation of a purchase transaction upon the requested web site for automatically retrieving personal data from the user's cyber wallet and entering said retrieved information upon the requested web site in accordance with the rules to complete the initiated purchase transaction.

20. A method to facilitate user interaction with merchant web sites, the method comprising operations of:
independent of user interaction with merchant web sites, performing operations comprising:
constructing a proxy platform corresponding to multiple merchant web sites by performing operations comprising: (1) planning a modified presentation of each merchant web site including one or more changes to functionality of the merchant web site, (2) pre-configuring rules to fill-in purchase checkout forms of each merchant web site with data from users' cyber wallets accessible to the proxy platform;
maintaining the proxy platform, by performing operations comprising: (1) on a repeating schedule, reviewing the merchant web pages to determine whether any changes have occurred rendering the proxy platform at least partially invalid, (2) if so, repeating the constructing operation for the merchant web site upon which the changes have occurred;

receiving users' requests to view merchant web sites;

for each request, determining whether a proxy platform corresponding to the requested merchant web site has been constructed, and only if so, responding to the request by performing operations comprising:

utilizing the requested web site's proxy platform as an overlay to provide the requesting user with the modified presentation instead of the requested web site;

responsive to user initiation of a purchase transaction upon the requested web site, the proxy platform automatically retrieving personal data from said user's cyber wallet and entering said retrieved information upon the requested web site in accordance with the pre-configured rules to complete the initiated purchase transaction.

21. The method of claim 20, where the proxy platform is operated by an online services provider having various subscribers, and the operations further comprise the Internet services provider rendering services of the proxy platform exclusively to said subscribers.

22. The method of claim 20, where the proxy platform is operated by an online services provider having various subscribers, and the operations further comprise: in addition to operating the proxy platform, the online services provider operating the cyber wallets.

* * * * *